United States Patent [19] [11] 3,876,007
Christopher [45] Apr. 8, 1975

[54] ACIDIZATION PROCESS
[75] Inventor: Charles A. Christopher, Houston, Tex.
[73] Assignee: Texaco, Inc., New York, N.Y.
[22] Filed: Apr. 1, 1974
[21] Appl. No.: 457,156

[52] U.S. Cl. ................ 166/307; 166/282; 166/308
[51] Int. Cl. ............................................. E21b 43/27
[58] Field of Search ........... 166/271, 281, 282, 304, 166/307, 308; 252/8.55 C

[56] References Cited
UNITED STATES PATENTS
3,377,275  4/1968  Wolfson et al................ 252/8.55 D
3,818,989  6/1974  Christopher...................... 166/274

*Primary Examiner*—Stephen J. Novosad
*Assistant Examiner*—George A. Suckfield
*Attorney, Agent, or Firm*—Thomas H. Whaley; Carl G. Ries

[57] ABSTRACT

A process is provided whereby a subterranean formation may be treated uniformly with acid at a controlled rate to a considerable distance from an injection point. The process includes the introduction of acid adsorbed on colloidal silica which usually takes the form of a free flowing apparently dry powder. This powder is slurried in a solvent, such as a light hydrocarbon fraction, to form a composition which, on contact with water in the reservoir, will liberate acid. The process allows the acid to penetrate some distance into the formation before the acid is liberated, thus having an effect similar to retarded acid and effecting a large radius around the well bore.

15 Claims, No Drawings

ACIDIZATION PROCESS

BACKGROUND OF THE INVENTION

1. Field of the Invention

The invention relates to the treatment of subterranean formations in order to increase productivity or injectivity of such formations by an improved acidizing technique.

2. Description of the Prior Art

Many petroleum-containing reservoirs are composed of limestone, dolomite or sandstone of low permeability. Although limestone and dolomite formations may contain large quantities of petroleum materials their permeabilities are generally quite low so that the oil production rates from them may be uneconomic because of resistance of the formations to fluid flow. Areas in the formation a substantial distance from the producing wells penetrating the formation may not be drained at all. A common method that has been used in an effort to stimulate production from such formations has been acidization. That is, acid is generally pumped down the well and displaced into the formation to dissolve a part of the formation and create channels of increased permeability thereby increasing fluid conductivity in the formation. Limestone or dolomite formations are generally best treated with hydrochloric acid or a similar acid and sandstone formations are treated with a mixture of hydrochloric and hydrofluoric acid. It is often necessary to pump the acid into the formation at a rate that will fracture the formation thus conducting it rapidly therein to avoid expending the acid in the area near the well bore. If the acid is expended only around the well bore it will have no beneficial effect in increasing transmissibility of fluid present a substantial distance from the well bore.

However, the presence of fractures extending from the well into the surrounding formations does not necessarily greatly increase the amount of acid that reaches substantial distances from the well bore before being spent by reaction with the formation. The high temperature of most subterranean formations and the extremely rapid reaction of the mineral acids which are used causes most of the acid to be neutralized by reaction with the calcareous formation before it can traverse a great distance into the formation from the well bore. One prior art method that has been used in an effort to acidize fractures more effectively has been to protect the faces of the fractures by coating them with a material such as a gel that will be slowly destroyed by the acid as it is displaced into the fracture. However, these coatings are only partially effective because the coating on that portion of the fracture closest to the well is the first to be contacted with acid and destroyed. Acid subsequently displaced into the fracture passes and contacts the exposed surface of the formation close to the well and is largely spent so that insufficient acid reaches the outer parts of the fracture. Similarly, sometimes fluid-loss reducing additives such as fine silica flour are added to control leak-off but the acid can quickly sweep the silica away and reacts rapidly with the thus exposed calcareous surface channels near the borehole so that much of the acid is again lost before reaching the outer limits of the fracture.

The difficulties in acidizing fractures at substantial distances from the well are aggravated in hot carbonate formations because the acid treatment methods heretofore available have resulted in little more than borehole enlargement at the high rate of reaction at the elevated temperature existing in such formations. The elevated temperature existing in hot carbonate reservoirs also aggravates the problem of inhibiting hydrochloric acid to prevent excessive corrosion by the acid of the casing and tubing in a well. Efforts have been made to pump large volumes of water ahead of the acid to cool the tubing and fracture faces. However, this procedure is not totally dependable and it is generally not desirable to pump large quantities of water into productive formations and especially not into gas reservoirs. U.S. Pat. No. 3,707,192 attempts to solve this problem by a multiple stage injection procedure whereby two substances are pumped into the formation sequentially; the second reacting with the first to form an acid capable of reacting with at least a portion of the formation. This method, however, requires two reactants to mix within the fracture to produce the acid. Such a process would be wasteful and a high efficiency of mixing would be unexpected in porous media. More importantly, the cited reactions would be expected to be very rapid and thus spent very quickly as in most other prior art processes.

SUMMARY OF THE INVENTION

The invention is a method for increasing productivity in a subterranean formation by acidization which comprises injecting a mixture of colloidal silica, a liquid acid and a hydrocarbon solvent. The colloidal silica and the acid are mixed into a free flowing powder which is then slurried in a solvent such as a light hydrocarbon. This slurry is then injected into the formation to be acidized. On contact with water in the reservoir acid will be liberated. The invention is also the free flowing powder mixture of colloidal silica and liquid acid.

DESCRIPTION OF THE PREFERRED EMBODIMENTS

The process of my invention is usually carried out by injecting the acid composition of my invention into a well penetrating and in communication with a subterranean reservoir so that the acid contacts the reservoir rock matrix. The reservoir usually contains petroleum or oil, but may contain other fluids such as water or a mixture of water and oil.

The composition of the process of my invention consists of three principal ingredients: colloidal silica, acid and solvents.

The colloidal silica useful in my invention is different from precipitated silica or silica gel. The colloidal silica useful in my invention is a fumed silica which is made up of chain-like formations sintered together. These chains are branched and have enormous external surface areas of from about 50 to about 400 meters$^2$/gram. Although the exact mechanism is not known, Applicant believes that the acid adsorbs onto the silica particles and the resultant mixture resembles a powder. However, when an aqueous fluid contacts the acid-colloidal silica mixture the acid is liberated from the colloidal silica particles.

Colloidal silicas are readily available from manufacturers. One source is the Cabot Corporation of Boston, Massachusetts under the trade name CAB-O-SIL. Colloidal silica is also available from other commercial sources and the reference to one source is not intended to limit the scope of my invention.

The colloidal silica acceptable for use in the method of this invention should have a particle size ranging from about 7 to 15 millimicrons (mu). In this size range the colloidal silica will pass through even reservoirs with very small pore size. For example, a reservoir having very low permeability of say 0.016 millidarcies (md) has a correspondingly small pore size to 25 to 100 mu. Thus, the colloidal silica suitable for use in the process of this invention will pass through even the smallest pores encountered in hydrocarbon reservoirs.

Colloidal silica suitable for the process of this invention is described in the literature. For example, U.S. Pat. No. 3,993,809 describes the colloidal silica of the invention and a method for its manufacture. These are other methods for its manufacture which produce colloidal silica as described herein.

Acids useful in this invention are generally those which will attack reservoir rock matrix. Those skilled in the art of petroleum recovery will readily chose the acid or mixtures of acids most suitable for a particular reservoir rock. Examples of suitable acids include but are not limited to mineral acids such as hydrochloric, hydrofluoric, sulfuric, phosphoric, nitric, and organic acids such as formic, acetic, etc., and oxalic, malonic, succinic, etc. Mixtures of the above acids may also be used as well.

Solvents are useful in the process of this invention, both for providing a medium in which to slurry the colloidal silica-acid powder and as a preflush fluid to be introduced ahead of the colloidal silica-acid-solvent slurry in the reservoir.

The solvent chosen to slurry the colloidal silica-acid powder may be of several broad types including solvents miscible with both water and oil, solvents miscible with oil but immiscible with water, and solvents miscible with water but not with oil. The choice of the solvent type will help dictate the character of acid treatment resulting. Once the connate water in the reservoir contacts the colloidal silica acid powder, the acid will be liberated and reaction with the reservoir rock matrix will begin. If the slurry solvent is of the type miscible with both water and oil or the type miscible with water and immiscible with oil the connate water will quickly penetrate the slurry, release the acid and allow the acid to attack the rock matrix soon after the acid enters the formation. Thus, the acidizing effect will be near the well bore. If the slurry solvent is immiscible with water the connate water will have more difficulty penetrating to the acid powder allowing it to travel farther from the well bore before it is released. Thus, the acidizing effect will be over a greater radius from the well bore. This has a similar effect to a retarded acid. In another embodiment of this invention this control of acid action on the formation may be supplemented by use of a preflush solvent in addition to a slurry solvent. The preflush fluid solvent may be of the same broad types as the slurry solvent although in a given acidization process the type of preflush solvent may be the same as or different from the type of slurry solvent.

If a preflush solvent is used which is miscible with both water and oil or miscible with water and immiscible with oil, the connate water will be pushed efficiently away from the well bore and, therefore, the acid slurry which follows will be able to penetrate far from the well bore before connate water liberates the acid resulting in acidization over a large radius from the well bore. Use of a preflush solvent immiscible with water would leave much connate water near the well bore and allow a more rapid connate water attack on the acid slurry resulting in acidization concentrated nearer the well bore.

Typical solvents miscible with water and oil and suitable for use to form the acid slurry or the preflush include but are not limited to acetone, higher alcohols, ethylene and polyethylene glycols, and glycerol.

Typical solvents miscible with oil and immiscible with water and suitable for use to form the acid slurry or the preflush include but are not limited to LPG and other hydrocarbon fractions, base crude, aldehydes and ketones.

A typical solvent miscible with water and immiscible with oil includes but is not limited to methanol.

The terms miscible and immiscible as used herein are not meant to be absolute but only to indicate a tendency. Thus, miscible may mean completely miscible in all proportions to partial miscibility. Immiscible may be little or no miscibility to slightly miscible. Whether a particular solvent is miscible or immiscible with a given oil must be determined in an individual case due to the infinite variety of reservoir oils.

Preparation of An Acid-Colloidal Silica Powder

To a Waring Blender add:
1. 180 gm Cab-O-Sil
2. 1,000 gm concentrated sulfuric acid and blend 15 seconds to prepare finely dispersed powder.

FIELD EXAMPLE

First, mix acid and colloidal silica as above to form dry powder. Then inject preflush of solvent to sweep water away from well bore. Use of a water immiscible solvent will leave an irreducible water saturation on the rock matrix which on contact with the adsorbed acid will liberate it and allow the acid to react with the rock matrix. For a more in depth treatment, a solvent such as acetone is used which is miscible with water and which will displace all the water from the rock matrix. In this example 200 barrels acetone is injected into the well to displace water out to a distance of 30 feet for the well bore. Next, inject 100 barrels of a 10 percent by weight slurry of powdered acid in the water miscible solvent. After the acid injection, overflush with 100 barrels of solvent to carry powdered acid slurry out into the reservoir. Then if an injection well is involved, return the well to water injection. However, if an oil production well is involved, overflush with 100 barrels of water followed by 100 barrels lease crude and return the well to production. The purpose here is to use water to liberate acid and oil to reestablish oil permeability.

I claim:

1. A method for acidizing a subterranean formation comprising
    contacting the subterranean formation with a mixture of colloidal silica and a liquid acid wherein said mixture resembles a free flowing dry powder.

2. A method for acidizing a subterranean formation comprising
    contacting the subterranean formation with a slurry comprising a solvent and a mixture of colloidal silica and a liquid acid wherein said mixture resembles a free flowing dry powder.

3. A method of claim 2 wherein the solvent is miscible with both water and oil.

4. A method of claim 2 wherein the solvent is miscible with oil and immiscible with water.

5. A method of claim 2 wherein the solvent is miscible with water and immiscible with oil.

6. A method of claim 2 wherein the acid comprises a mineral acid.

7. A method of claim 6 wherein the acid comprises sulfuric.

8. A method of claim 6 wherein the acid comprises hydrochloric.

9. A method of claim 6 wherein the acid comprises hydrofluoric.

10. A method of claim 2 wherein the acid is an organic acid.

11. A method for acidizing a subterranean formation comprising
introducing a preflush fluid into the formation and
following the preflush fluid with a slurry comprising a solvent and a mixture of colloidal silica and a liquid acid wherein said mixture resembles a free flowing dry powder.

12. A method of claim 11 wherein the preflush fluid is miscible with water.

13. A method of claim 12 wherein the slurry solvent is immiscible with water.

14. A method of claim 11 wherein the acid comprises a mineral acid.

15. A method of claim 11 wherein the acid comprises an organic acid.

* * * * *